H. AND L. HOFFMAN.
WATER CONNECTION FOR AUTOMOBILES.
APPLICATION FILED FEB. 10, 1920.
1,337,228.
Patented Apr. 20, 1920.
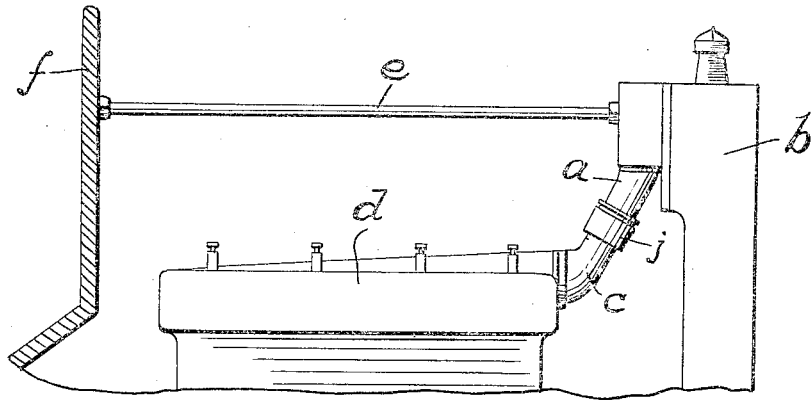
FIG. 1.
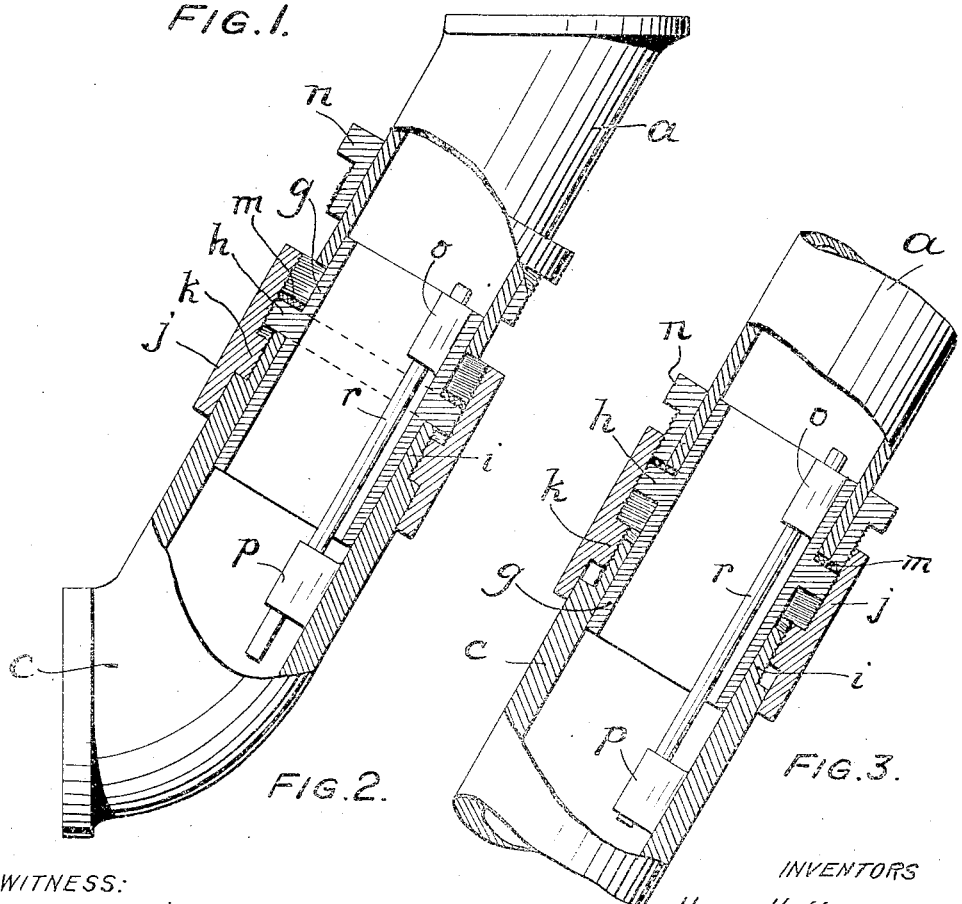
FIG. 2.
FIG. 3.
WITNESS:
Rob't P. Kitchel.
INVENTORS
Harry Hoffman
Louis Hoffman
BY Frank S. Busser
ATTORNEY.

UNITED STATES PATENT OFFICE.

HARRY HOFFMAN AND LOUIS HOFFMAN, OF PHILADELPHIA, PENNSYLVANIA.

WATER CONNECTION FOR AUTOMOBILES.

1,337,228.  Specification of Letters Patent.  Patented Apr. 20, 1920.

Application filed February 10, 1920. Serial No. 357,624.

*To all whom it may concern:*

Be it known that we, HARRY HOFFMAN and LOUIS HOFFMAN, citizens of the United States, residing at Philadelphia, county of Philadelphia, and State of Pennsylvania, have invented a new and useful Improvement in Water Connections for Automobiles, of which the following is a full, clear, and exact description, reference being had to the accompanying drawings, which form a part of this specification.

The object of our invention is to provide a connection for the ends of water pipes in the cooling systems of automobiles which may be applied to one of the pipe ends and then adjusted to form between the pipe ends a water tight connection possessing the qualities of durability, flexibility, and rigidity after adjustment.

The usual method of making connections between the ends of water pipes in cooling systems is by the use of lengths of rubber hose, which are slipped over the ends of the pipes and clamped in place by means of clamps. Leakage is prevented by shellacking the ends of the pipes.

The present devices are open to a number of serious objections in that the hot water rots the inner lining of the hose, causing it to drop off and block the system, or parts of it. The action of anti-freezing solutions greatly increases the rotting action. The internal rotting and the action of grease on the outside of the hose softens it to such an extent that when the water is pumped through the system, the suction of the pump constricts the hose and shuts off circulation.

When the hose is removed for any reason, it is usually rendered useless from the necessity of prying it away from the pipes to which it is stuck by the shellac.

The rubber hose requires constant renewal and except when in perfect condition renders inefficient service and is a source of danger to the working of the system.

The connection constructed in accordance with our invention is adaptable to any cooling system and is possessed of the required flexibility, combined with durability, which renders it completely efficient in operation.

We will now proceed to describe our invention in connection with the accompanying drawings, in which we have illustrated an embodiment of our invention as applied to the return line from the engine to the radiator of a Ford automobile.

Figure 1 is a partial elevation of an engine and radiator with our improved water connection interposed.

Fig. 2 is a longitudinal sectional view of our improved water connection before the joint is tightened.

Fig. 3 is a similar view showing the joint tightened.

The pipe $a$ extends from the under side of the radiator tank $b$. The pipe $c$ is flanged and bolted to the cylinder head and communicates with the water jackets of the engine $d$. The adjustable radiator rod $e$ extends from the dashboard $f$ to the radiator and acts to brace the radiator.

A gland $g$, having an annular flange $h$ between its ends, is adapted to fit into pipe $a$. The flange $h$ is screw-threaded exteriorly. The outer end $i$ of pipe $c$ is reduced in diameter and screw-threaded. One of these threads is a right hand thread and the other a left hand thread.

A sleeve $j$ is provided with an internal annular projection $k$, which is screw-threaded to engage the reduced threaded end of pipe $c$. On one side of the annular projection the sleeve is screw-threaded in the opposite direction to engage the threaded flange $h$ of the gland $g$.

A washer $m$, or any suitable packing material, is placed between the end of pipe $a$ and the flange $h$. A packing nut $n$, suitably threaded, surrounds the end of pipe $a$ and engages the adjacent threaded end of sleeve $j$.

The gland $g$ is provided with an internal shoulder $o$ and the pipe $c$ with a similar shoulder $p$. Both shoulders are drilled for the reception of a connecting pin $r$, whereby the gland $g$ is prevented from turning relatively to the pipe $c$.

The gland $g$ is of such length that it extends within the end of pipe $c$, which is therefore confined between the gland $g$ and the sleeve $j$.

By turning the sleeve $j$ so that it moves outward on the threaded end $i$ of pipe $c$, the gland $g$ is advanced in the same direction but for twice the distance until the washer $m$ is forced against the end of pipe $c$, thereby creating a water tight joint between the gland $g$ and the pipe $a$. The gland $g$ is of sufficient length not to be entirely retracted from the threaded end $i$ of pipe $c$, so that the latter continues to be confined between the gland $g$ and sleeve $j$, thus maintaining a water tight joint at the end of pipe c.

If, for any reason, it is desired to disrupt the connection, the sleeve j is turned in the reverse direction to that described until the gland g is retracted from the pipe a. The connection remains in engagement with the pipe c. When the connection is reëngaged with the pipe a its efficiency has not been impaired by its temporary disengagement. In fact, the life of the connection is indefinite, and no renewals are ever necessary.

Having now fully described our invention, what we claim and desire to protect by Letters Patent is:

1. In a water tight connection between the separated ends of water pipes in automobiles, the combination with the pipes, one of which has an exteriorly threaded end, of a sleeve having two interior threads one of which engages said threaded pipe end, and a gland adapted to engage the other pipe end and having an exterior thread engaging the other thread of the sleeve.

2. In a water tight connection between the separated ends of water pipes in automobiles, the combination with the pipes, one of which has an exteriorly threaded end, of a sleeve having two interior threads one of which engages said threaded pipe end, a gland adapted to engage the other pipe end and having an exterior thread engaging the other thread of the sleeve, and means connecting the first pipe and the gland adapted to allow a longitudinal movement of the gland but preventing it from turning.

3. In a water tight connection between the separated ends of water pipes in automobiles, the combination with the pipes, one of which has an exteriorly threaded end, of a sleeve having two interior threads one of which engages said threaded pipe end, a gland, and an external threaded annular flange on the gland engaging the other thread of the sleeve, the end of said gland on one side of its flange extending within said threaded pipe end and the end of the gland on the other side of its flange adapted to extend within the other pipe end.

4. In a water tight connection between the separated ends of water pipes in automobiles, the combination with the pipes, one of which has an exteriorly threaded end, of a sleeve having two interior threads one of which engages said threaded pipe end, a gland, an external threaded annular flange on the gland engaging the other thread of the sleeve, the end of said gland on one side of its flange extending within said threaded pipe end and the end of the gland on the other side of its flange adapted to extend within the other pipe end, and means restraining the gland from turning.

5. In a water tight connection between the separated ends of water pipes in automobiles, the combination with the pipes, one of which has an exteriorly threaded end, of a sleeve, an internal annular flange on the sleeve and threaded on said threaded pipe end, a gland, means preventing the gland from turning, an external annular flange on the gland threaded in the sleeve beyond the internal flange thereof, the end of the gland on one side of its flange extending within the threaded pipe end and the end of the gland on the other side of its flange adapted to be moved, by the turning of the sleeve, into the other pipe end until its movement is arrested by the opposition of its external flange and the last named pipe end.

6. In a water tight connection between the separated ends of water pipes in automobiles, the combination with a pipe having a reduced threaded end, of a sleeve, an internal annular flange between the ends of the sleeve and threaded on said reduced pipe end, said sleeve thereby adapted to be turned into position to embrace the end of the enlarged part of said pipe behind its reduced end, a gland, means preventing the gland from turning, an external annular flange between the ends of the gland and threaded in the sleeve beyond the internal flange thereof, one end of the gland extending within the threaded pipe and the flange of the gland adapted to be moved into engagement with the other pipe end by turning the sleeve in one direction.

7. In a water tight connection between the separated ends of water pipes in automobiles, the combination with the pipes one of which has a threaded end, of a turnable sleeve having two interior threads one of which engages said threaded pipe end, a gland adapted to enter the other pipe end, an external flange on the gland having an exterior thread engaging the other thread of the sleeve, means to prevent the gland from turning with the sleeve, and a packing nut threaded on the last named thread of the sleeve and extending between the sleeve and the last named pipe end.

In testimony of which invention, we have hereunto set our hands, at Philadelphia, Pa., on this 6th day of February, 1920.

HARRY HOFFMAN.
LOUIS HOFFMAN.